United States Patent [19]

vom Braucke et al.

[11] 4,202,414
[45] May 13, 1980

[54] LAWN CULTIVATING MACHINE

[75] Inventors: Hans vom Braucke, Vlotho; Manfred vom Braucke; Walter Schuring, both of Bielefeld, all of Fed. Rep. of Germany

[73] Assignee: Bielefelder Kuchenmaschinen-u. Transport-Geratefabrik vom Braucke GmbH, Fed. Rep. of Germany

[21] Appl. No.: 888,132

[22] Filed: Mar. 20, 1978

[51] Int. Cl.² ............... B62D 51/04; A01B 45/04
[52] U.S. Cl. ......................... 172/42; 172/21; 172/69; 172/349; 172/547
[58] Field of Search ............. 172/69, 105, 106, 120, 172/184, 256, 349, 350, 351, 520, 547, 555, 558, 561, 393, 548, 21, 42

[56] References Cited

U.S. PATENT DOCUMENTS

| | | | |
|---|---|---|---|
| 200,327 | 2/1878 | Moore | 172/350 |
| 260,342 | 6/1882 | Williamson | 172/547 X |
| 331,588 | 12/1885 | Walker et al. | 172/69 X |
| 863,983 | 8/1907 | Gletty | 172/69 X |
| 1,585,944 | 5/1926 | Strite | 172/256 X |
| 1,641,393 | 9/1927 | MacKie | 172/69 |
| 1,807,182 | 5/1931 | Stoner | 172/349 |
| 1,812,708 | 6/1931 | Nygard et al. | 172/393 X |
| 3,397,748 | 8/1968 | Whitesides | 172/548 |
| 3,970,012 | 7/1976 | Jones, Sr. | 172/520 X |

FOREIGN PATENT DOCUMENTS

| | | | |
|---|---|---|---|
| 336334 | 4/1977 | Austria | 172/69 |
| 20320 | of 1902 | United Kingdom | 172/520 |

*Primary Examiner*—Richard T. Stouffer
*Attorney, Agent, or Firm*—Lane, Aitken & Ziems

[57] ABSTRACT

A lawn cultivating machine comprising two parallel cutter shafts which are connected together by a transmission gear and are rotatable about their axes, and on each of which shafts a plurality of cutters are arranged at spaced intervals from each other, the cutters of one shaft being displaced relative to the cutters of the other shaft, in which the speeds of the cutter shafts are in a certain transmission ratio and the directions of rotation of both cutter shafts are identical.

8 Claims, 5 Drawing Figures

LAWN CULTIVATING MACHINE

BACKGROUND OF THE INVENTION

The present invention concerns a lawn cultivating machine having two parallel cutter shafts connected together by a transmission gear and rotatable about their axes, on each of which shafts a plurality of cutters are provided at spaced intervals from each other, said cutters of one shaft being displaced relatively to the cutters of the other shaft.

The surfaces of lawns, with increasing age, tend to be subjected to the formation of moss thereon. Bulky layers of remaining, slowly rotting parts of plants may also be formed on the surface of the lawn, the topmost layer of soil becoming compressed. Layers of moss and the like restrict the growth of the lawn, so that it becomes thin, uneven and unsightly. In order to prevent this development, it is known to verticulate the lawn, whereby the soil is traversed and loosened on the surface utilizing knife-like blades. A customary implement for this is the verticulating rake which is drawn over the lawn. Since the individual blades execute an uninterrupted cut in the soil, a large amount of force is necessary. This treatment has the further disadvantage that there is the risk of pulling too many lawn plants out of the soil.

SUMMARY OF THE INVENTION

The object of the present invention is to provide a machine by means of which moss, and other bulky layers can be carefully extracted from the lawn and by means of which the soil can be ventilated and loosened in a simple manner.

According to the present invention there is provided a lawn cultivating machine comprising two parallel cutter shafts which are connected together by a transmission gear and are rotatable about their axes, and on each of which shafts a plurality of cutters are arranged at spaced intervals from each other, the cutters of one shaft being displaced relative to the cutters of the other shaft, in which the speeds of the cutter shafts are in a certain transmission ratio and the directions of rotation of both cutter shafts are identical.

The speed of the cutter shaft disposed forwardly in the working direction is preferably less than the speed of the rear cutter shaft.

The cutter shafts are preferably mounted on a common frame. The frame is preferably manually driven and has a yoke-shaped handle for transmitting the thrust of the operator. The frame may alternately be motor-driven.

It is preferable for the cutters to be circular discs with teeth projecting radially from the circumference thereof. The cutters may also be circular discs having teeth projecting from the circumference at an angle to the radial direction. The teeth of the cutters lying at the rear in the working direction are preferably inclined backwardly relative to the soil, whilst the teeth of the cutters lying forwardly in the working direction are inclined forwardly relative to the soil.

It is preferable for the transmission gear to be a chain drive, a chain wheel being secured to each cutter shaft and the chain wheels being enclosed by a common chain. The chain wheel of the rear cutter shaft preferably has a smaller radius than the chain wheel of the front cutter shaft.

The transmission gear is preferably arranged in the middle of the cutter shafts. A total of two transmission gears is preferably provided which are arranged on the ends of the cutter shafts, each transmission being provided with free motion.

It is preferable for at least one of the two cutter shafts to be provided with a stripper plate or cleaner mounted on the frame, the teeth of the cutters projecting into the slots of the stripper. Both cutter shafts are preferably provided with a common stripper which is preferably located between the cutter shafts and parallel thereto on the frame. It is preferable for the stripper plate to be mounted on a shaft parallel to the cutter shafts and held in an end position by a spring.

DETAILED DESCRIPTION OF THE PREFERRED EMBODIMENTS

Figure 1:
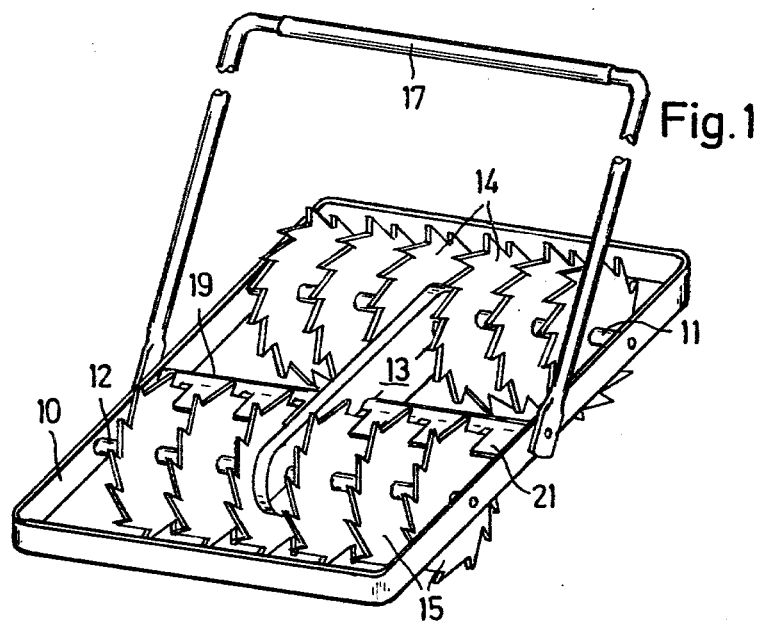
FIG. 1 shows a perspective view of a lawn cultivating machine according to the present invention.

The lawn cultivating machine of the present invention is constructed, according to FIG. 1, of two cutter shafts 11 and 12 mounted in a frame 10, said shafts being connected together by a transmission gear 13. Secured to the cutter shaft 11 are a plurality of cutters 14 and secured to the cutter shaft 12 are a plurality of cutters 15, each of which has the same clearance from each other. The cutters 14 of the cutter shaft 11 are displaced relative to the cutters 15 of the parallel cutter shaft 12. In this manner the soil 16 (FIG. 2) to be prepared is efficiently opened up, the surface of which is covered with a layer of grass.

The lawn cultivating machine may be manually operated by pushing or pulling it by means of a yoke-shaped handle 17. However, it is also possible to drive the machine by means of an electric motor or an internal combustion engine.

Figure 5:
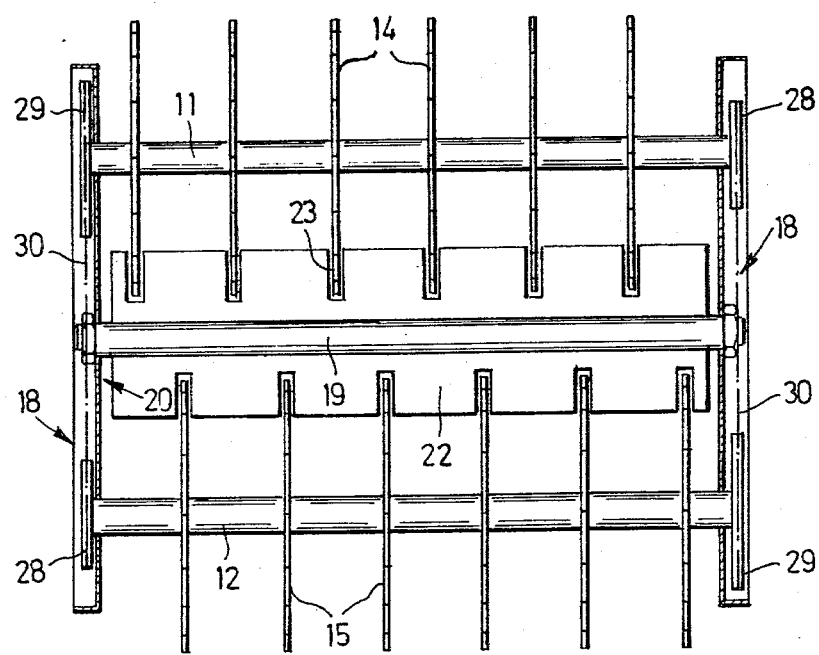
FIG. 5 shows a plan view of a machine with transmission gears arranged on both sides.

According to FIG. 5, both cutter shafts are connected at their ends by two transmission gears 18, the housings of which are secured to the ends of a centre shaft 19. The housings of the transmission gears 18 and the shaft 19 form the frame 20. The shaft 19 also serves as the mounting point for a stripper blade 21 which is arranged on the frame 10 and for a stripper blade 22 which is provided on the frame 20. Each stripper blade 21 and 22 is provided with slots 23 into which the cutters 14 and 15 extend. The strippers 21 and 22 prevent soil, moss or portions of plants, which are picked up by the blades 14 and 15 from the ground 16, from sticking to said blades. Each stripper 21 and 22 is journalled to pivot and held in an end position secured by a bearing stud 24. For this purpose, a spring 25 is used secured by the stud 24 to the frame 10 or 20. The bearing stud 24 may also be secured to the housing of the transmission gear 13 or 18.

The blades 14 and 15 are provided with peripheral teeth 26 and 27 similarly to the blade of a circular saw. The teeth 26 and 27 may project from the cutters 14 and 15 either radially or be inclined relatively to the radial direction by an angle α. At the same time, the teeth 26 of the cutters 14 on the ground 16, viewed in the working direction, are inclined backwardly by the angle α, whilst the teeth 27 of the cutters 15 on the ground 16, viewed in the working direction, are inclined forwardly.

Figure 2:
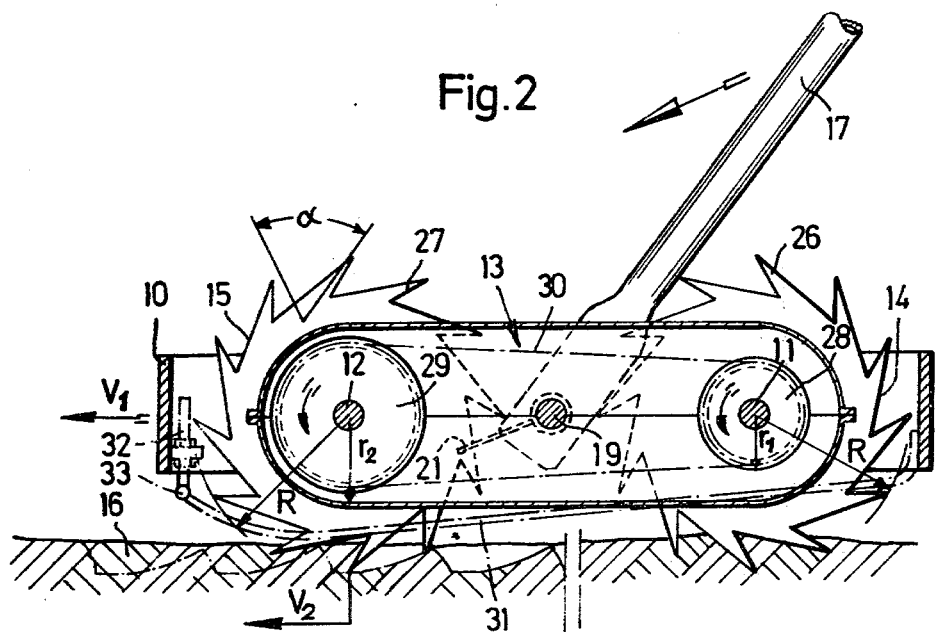
FIG. 2 shows a longitudinal section through the machine according to FIG. 1.
Figure 3:
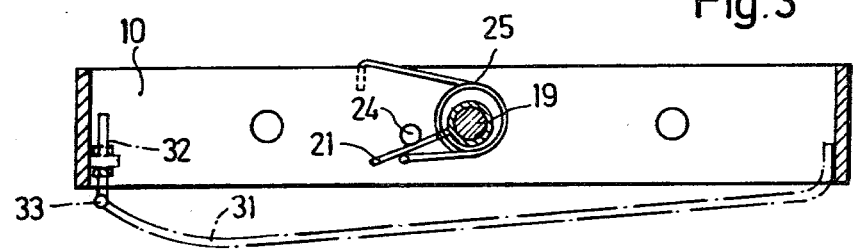
FIG. 3 shows the arrangement of a stripper plate on the frame of the machine.

The transmission gear 13 of the apparatus comprises, according to FIG. 2, a chain wheel 28, located on the cutter shaft 11, a chain wheel 29, located on the cutter shaft 12, and a chain 30 encircling both chain wheels 28 and 29. These transmission gears may also be formed as infinitely variable transmission gears. With the use of a chain drive, the front chain wheel 29, viewed in the working direction, has a larger diameter than the rear chain wheel 28. The transmission ratio of the transmission gear is determined by the ratio of the diameter and the ratio of the radius. It is also possible to provide each cutter shaft 11 and 12 with a smaller chain wheel 28 and a larger chain wheel 29, as shown in FIG. 5, the smaller chain wheel 28 and the larger chain wheel 29 being connected together in each case by the chain 30. In this event the machine can only work, however, if each of the two transmission gears 18 are provided with free motion. It is then possible to work the soil 16 in both directions of movement of the machine, by moving it backwardly and fowardly by means of its handle 17. Such a more expensive embodiment of the machine makes it possible to treat the soil more intensively.

The lawn cultivating machine of the present invention operates as follows: When the machine is pushed, for instance, according to FIG. 2, the rotations of the cutter shafts 11 and 12 are automatically adjusted according to the conditions of the soil. In the case of soil 16 which has been made uniform, and with the same number of cutters 14 on the shaft 11 and cutters 15 on the shaft 12 and with these cutters having the same size, the cutters 14 of the shaft 11 roll over the surface of the soil 16 without any slip occurring. The teeth 26 penetrate into the soil 16 and execute only a slight cutting movement in the soil which is obtained only because of its adjustment by the angle α. On the other hand, the rolling movement of the cutters 15 of the shaft 12 on the soil 16 is superimposed by a cutting movement of the teeth 27 in said soil 16 which is obtained on account of the slip occurring there between the soil 16 and the cutters 15. These movement ratios, in which a slip occurs on the cutters 15, relatively to the soil 16, but no slip on the cutters 14, is due to the fact that the speeds of the cutter shafts 11 and 12 are kept within a certain transmission ratio by means of the transmission gear 13.

As a result of this reduction ratio, the peripheral force on the cutters 15 of the more slowly rotating shaft 12 is greater than the peripheral force on the cutters 14 of the more quickly rotating shaft 11, which can easily be accounted for due to the different lengths of the levers. Therefore the cutters roll on the ground 11 without slip, whilst, during contact of the cutters 15 with the ground 16, a relative movement occurs. This movement, which acts on the teeth 27 of the cutters 15 in the desired manner as a working movement for loosening the soil, can be obtained as follows:

Let the frame 10 be moved with a speed $v_1$ over the soil 16. With the radius R of the teeth 26 and the radius $r_1$ of the chain wheel 28, the speed of the chain is obtained as $v_1 \cdot r_1 / R$.

On the shaft 12 the cutters 15 are driven by the frame at the same speed $v_1$ and by the chain 30 with the speed of the chain. Then the speed of the teeth 27 on the soil 16 is $$v_2 = v_1 - v_1 \cdot r_1 / R \cdot R / r_2 = v_1 \cdot (1 - r_1 / r_2),$$

since the radii R of the teeth 26 and 27 on the cutters 14 and 15 should be the same. Since the chain wheel 28 has the smaller radius $r_1$ and the chain wheel 29 the larger radius $r_2$, the teeth 27 move relative to the soil 16 at a speed $v_2$ which, viewed absolutely, is less than the speed $v_1$ of the frame 10, because the chain speed below the cutter shafts 11 and 12 is directed oppositely to the speed $v_1$. At the speed $v_2$ the teeth 27 execute their cutting movements in the soil 16. With the selection of the speeds of rotation, according to the present invention, of the lawn cultivating machine, cutting movements in the soil can therefore be carried out with the teeth 27 of the cutters 15 of the shaft 12, whilst the teeth 26 of the cutters 14 of the shaft 11 serve only for supporting action.

In the embodiment of the machine according to FIG. 5, on the one hand, the cutters 14 of the shaft 11 are supported on the ground during reciprocating movements, whilst the cutters 15 of the shaft 12 effect the cutting action. In this case the transmission gear 18, shown on the right of the drawing, operates, whilst the transmission 18, on the left hand side of the drawing, is cut out by its free motion. During the return movement of the machine, on the other hand, the cutters 15 of the shaft 12 are supported in the soil 16, whilst the cutters 14 of the shaft 11 do the cutting work. In this case the transmission gear 18, shown on the left of the drawing, operates, whilst the transmission gear 18, shown on the right side, is cut out by its free motion. The cutting blades of the lawn cultivating machine of the present invention penetrate into the soil and move therein over a short path relative to the soil, so that they open up and loosen same. Moss and parts of plants, hindering growth, are removed from the soil. For certain desired actions on the soil, the teeth of the cutters can also be set on the periphery of the cutters as in the case of a circular saw. The desired working width of the machine is adjusted by joining several cutters together at respective clearances on the cutter shafts. Penetration of the teeth in the soil is effected by the weight of the machine, said weight acting vertically downwardly. By means of the handle, a further force component may be imparted to the machine downwardly in a vertical direction. When the teeth penetrate into the soil they act like claws therein.

If there is a lack of uniformity in the nature of the soil, the teeth of the cutters on the more slowly rotating shaft may rest in the soil, whilst the teeth of the cutters of the faster rotating shaft execute a relative movement thereto in the soil. It may also happen that the cutters of both shafts move with slip over the soil. A change in the behaviour of the cutters may also be achieved if the number of cutters on the faster rotating shaft is reduced according to the transmission ratio. In the normal case both shafts have the same number of cutters. Finally, the teeth on the cutters of both shafts may be made differently, thus resulting in additional types of movement of the teeth in the soil.

Figure 4:
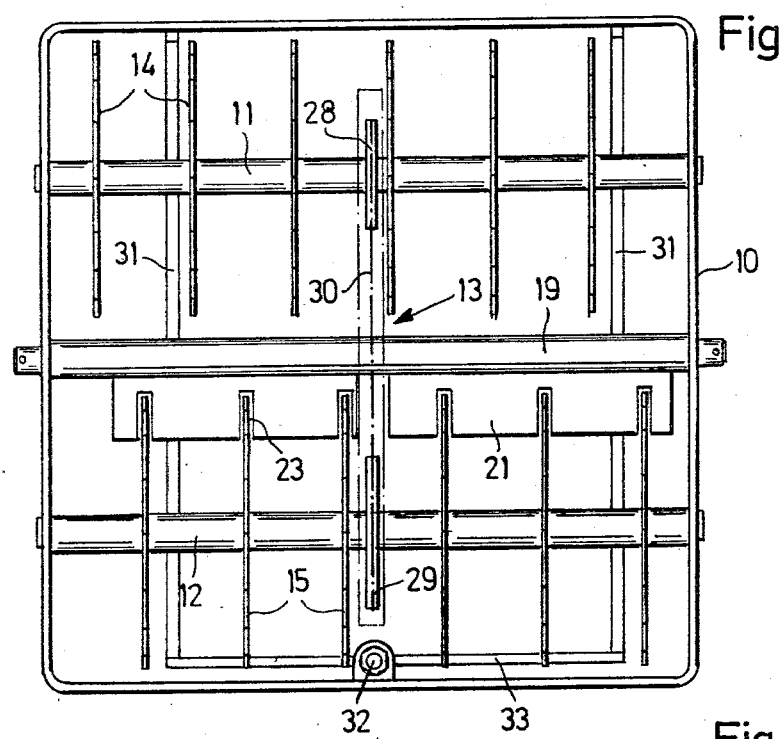
FIG. 4 shows a plan view of a machine with the transmission gear arranged in the centre.

In FIG. 2 a skid arrangement of two narrow skids 31 is shown, the ends of which are secured to the frame 10 on the opposite sides in the direction of movement. It is preferable, to make one end, particularly the end of the skid 31 adjacent to the chain wheel 29 adjustable by means of a length adjusting device 32 (e.g. screw adjustment). These skids 31 can limit penetration of the cutters 15 into the soil, so that the machine is easier to move in this manner with less penetration of the cutters 15. By adjusting the level of the skids 31, the movement of the machine can therefore be varied. As shown in FIG. 4, two skids 31 may be connected by a connecting strip 33 made in one piece therewith or by a separate strip 33. By this means both skids 31 can be vertically adjusted simultaneously by the adjusting device 32.

If moss or the residues of plants become clogged in the teeth of the cutters during the removal of these materials, the stripper plates 21 and 22, which yield resiliently in the manner of pawls during movement against the incline of the teeth, clean the cutters of this material. In doing this, the strippers 21 and 22 do not come into contact with the cutters rotating in the slots 23. Only the projecting material is engaged and stripped off.

Since the movement of the teeth 27 is composed of a rotary movement and a linear movement, moss and bulky layers in the soil 16 are not only torn open but also lifted out.

The lawn cultivating machine of the present invention may of course be also "stood on its head" on the soil, so that the cutter shaft 11 lies forwardly in the direction of travel and pulls the cutter shaft 12 with the cutting blades behind it.

We claim:

1. In a lawn cultivating machine of the type comprising two parallel cutter shafts which are mounted on a common frame and interconnected by a transmission gear and rotatable about their axes, each of which shafts has a plurality of circular discs arranged thereon in a spaced apart relationship, the discs of one shaft being offset or displaced relative to the discs of the other shaft, and the discs of at least one shaft being structurally adapted as cutters with teeth projecting radially from the circumference of each disc of said at least one shaft, whereby the speeds of both shafts are in a certain transmission ratio and the directions of rotation of both shafts are the same, the improvement characterized by the features that all the circular discs are formed as identically fashioned cutters, the teeth of which projecting from their circumference are located relative to the radial direction at an angle whereby the teeth of the rear cutters, in the direction of operation, are inclined toward the rear at the ground, while the teeth of the front cutters in the direction of operation are forwardly inclined at the ground, wherein, in all, two gearings are provided which are located at the ends of the cutter shafts, and at least one of the two cutter shafts is provided with a scraper plate which is pivotally mounted on a shaft on the frame, between the cutter shafts and parallel thereto, and which is retained by a spring in an end position, said plate being provided with slots and the teeth of the cutters engaging in the slots of the plate.

2. A machine as recited in claim 1, wherein the frame is manually driven and has a yoke for transmitting the thrust force of an operator.

3. A machine as recited in claim 1, wherein said scraper plate is common to both of said cutter shafts.

4. A machine as recited in claim 1, wherein runners are located laterally to the cutters, the ends of which runners are secured to the frame.

5. A machine as recited in claim 4, in which one end of each of the runners is mounted longitudinally adjustable by means of an adjustment device.

6. In a lawn cultivating machine of the type comprising two parallel cutter shafts which are mounted on a common frame and interconnected by a transmission gear and rotatable about their axes, each of which shafts has a plurality of circular discs arranged thereon in a spaced apart relationship, the discs of one shaft being offset or displaced relative to the discs of the other shaft, and the discs of at least one shaft being structurally adapted as cutters with teeth projecting radially from the circumference of each disc of said at least one shaft, whereby the speeds of both shafts are in a certain transmission ratio and the directions of rotation of both shafts are the same, the improvement characterized by the features that all the circular discs are formed as identically fashioned cutters, the teeth of which projecting from their circumference are located relative to the radial direction at an angle whereby the teeth of the rear cutters, in the direction of operation, are inclined toward the rear at the ground, while the teeth of the front cutters in the direction of operation are forwardly inclined at the ground, wherein at least one of the two cutter shafts is provided with a scraper plate which is pivotally mounted on a shaft on the frame, between the cutter shafts and parallel thereto, and which is retained by a spring in an end position, said plate being provided with slots and the teeth of the cutters engaging in the slots of the plate.

7. A machine as recited in claim 6 wherein the frame is manually driven and has a yoke for transmitting the thrust force of an operator.

8. A machine as recited in claim 6 wherein runners are located laterally to the cutters, the ends of which runners are secured to the frame.

* * * * *